US007539644B2

(12) United States Patent
Hu et al.

(10) Patent No.: US 7,539,644 B2
(45) Date of Patent: May 26, 2009

(54) METHOD OF PROCESSING ONLINE PAYMENTS WITH FRAUD ANALYSIS AND MANAGEMENT SYSTEM

(75) Inventors: Tie Hu, Scarborough (CA); Rui Cao Mu, Richmond Hill (CA); Kamil Khan, Markham (CA)

(73) Assignee: Softroute Corporation, Ontario (CA)

(*) Notice: Subject to any disclaimer, the term of this patent is extended or adjusted under 35 U.S.C. 154(b) by 125 days.

(21) Appl. No.: 11/715,587

(22) Filed: Mar. 8, 2007

(65) Prior Publication Data
US 2008/0222002 A1 Sep. 11, 2008

(51) Int. Cl.
*G06Q 30/00* (2006.01)
(52) U.S. Cl. .......................... 705/38; 705/64
(58) Field of Classification Search .............. 705/26–27, 705/35, 38–43, 64–79; 455/410–411; 379/127.02, 379/114.14, 144.03, 145, 189
See application file for complete search history.

(56) References Cited

U.S. PATENT DOCUMENTS

| | | | | |
|---|---|---|---|---|
| 6,122,624 A | * | 9/2000 | Tetro et al. | 705/44 |
| 6,157,825 A | * | 12/2000 | Frederick | 455/410 |
| 7,426,492 B1 | * | 9/2008 | Bishop et al. | 705/39 |
| 2002/0099649 A1 | * | 7/2002 | Lee et al. | 705/38 |
| 2002/0194119 A1 | * | 12/2002 | Wright et al. | 705/38 |
| 2003/0149900 A1 | * | 8/2003 | Glassman et al. | 713/202 |
| 2005/0154676 A1 | * | 7/2005 | Ronning et al. | 705/44 |
| 2007/0094095 A1 | * | 4/2007 | Kilby | 705/26 |
| 2007/0100680 A1 | * | 5/2007 | Kumar et al. | 705/10 |
| 2007/0239604 A1 | * | 10/2007 | O'Connell et al. | 705/50 |

OTHER PUBLICATIONS

Kresbach, "The Other Victims of ID Fraud", Bank Technology News, v17, n3, p. 32-34, Mar. 1, 2004.*

* cited by examiner

*Primary Examiner*—Mary Cheung
(74) *Attorney, Agent, or Firm*—Tran & Associates (57) ABSTRACT

Systems and methods are disclosed to detect fraud by analyzing customer purchasing behavior for a high value item intentionally placed next to commonly purchased items, payment information for an address verification system (AVS), customer behavioral information, password sharing between two accounts, unique identification for a hardware component of a client computer used to purchase items on line, administrative information associated with a customer account; and Internet Protocol (IP) address.

19 Claims, 10 Drawing Sheets

Online Transaction Processing System with Fraud Analysis and Management

FIG. 1 Online Transaction Processing System with Fraud Analysis and Management System FIG. 2 Information Collection Mechanism FIG. 3 Online Transaction Processing System with Fraud Analysis and Management FIG. 4 Transaction Processing Flow ■ af_base_transaction:

| Payment ID | Transaction ID | Gate | Item | Amount | Channel | Place Date |
|---|---|---|---|---|---|---|
| 247674 | 1168662430689bd | M | 1 | 10.00 | 0 | 2007-01-13 04:36:06 |
| 252431 | 5FH6759603893463L | P | 1 | 10.00 | 0 | 2007-02-14 21:05:42 |
| 252669 | 11715687255a0b9 | M | 70 | 200.00 | 22 | 2007-02-15 19:58:13 |

Gate: M-Moneris, P-PayPal;

| Payer ID | Payer Type | Payer Status | Payer IP | IP Country | Email |
|---|---|---|---|---|---|
| 4264***8463 | V | 5 | 151.201.32.200 | US | sylviadivemaster@yahoo.com |
| tie.hu@hotmail.com | P | V | 69.10.232.5 | CA | tie.hu@hotmail.com |
| 4482***0808 | V | 5 | 172.162.119.82 | US | bill_selt@yahoo.com |

Payer Type: V-Visa, M-MasterCard, P-PayPal;

| Customer ID | Hardware ID | Password | First Name | Last Name |
|---|---|---|---|---|
| divemaussyl | 7996352022469615271 | 250268 | Sylvia | Tan |
| stephen | 7996352022569852401 | qazokm | Tie | Hu |
| bill_selt | 4204914216714639718 | habi123 | | |

| Street | City | State | Country | Post Code | Phone |
|---|---|---|---|---|---|
| 317 Squire Cir | Pittsburgh | PA | US | 15212 | |
| 161 Old Sheppard Ave | North York | ON | CA | M2J3M2 | 14168831234 |
| | | | | | |

| Gate Status | Transaction Status | Admin Status | Indexes | Reason |
|---|---|---|---|---|
| A | L | | PeS:1;PeRg:100;PrRg:0;... | [PA, PeRBp_t]: Less or equal to $50 + Customer has at least 1 payment 2 months ago |
| A | L | | PeS:1;PeRg:+1000;... | [PeRg:EXt]:Exception Loaded |
| | T | | PeS:1;PeRg:0;PrRg:0;... | [PemRa_t_t]: Traped from hardware ID before |

■ af_base_transaction_his:

| Payment ID | Customer ID | Transaction ID | Amount | Gate Status |
|---|---|---|---|---|
| 252672 | gijomath | 117157180370482 | 0.00 | A |
| 252669 | bill_selt | 11715687255a0b9 | 0.00 | |
| | | | | |

| Transaction Status | Admin Status | Operation | Operation Date | Memo |
|---|---|---|---|---|
| | | TL | 2007-02-15 20:47:20 | payment_moneris_submit.php |
| | | TT | 2007-02-15 19:58:13 | payment_moneris_submit.php |
| | | | | |

FIG. 5 An example of Tables in Transaction Database 301 af_index:

| ID | Number | On/Off | Parameter1 | Default | Memo |
|---|---|---|---|---|---|
| PemSt_r | 3 | O | INTERVAL 15 DAY | 0 | How many payers from the same machine tried with in a period |
| PemRa_c_t | 15 | O | INTERVAL 3 YEAR | 0 | How many charge backs from one machine with in period |
| PemRWp_m | 34 | O | INTERVAL 1 MONTH | 0 | Payment amount passed from machine with in period | af_rule_index_convert:

| Index | Index Char | Index Number Min | Index Number Max | Index Value |
|---|---|---|---|---|
| PeRg | BLK | 0.00 | 99999.99 | 2000 |
| PeRg | EXt | 0.00 | 99999.99 | 1000 |
| PeS | Block | 0.00 | 99999.99 | 100 |

FIG. 6 An Example of Tables in Index Engine 310.

- af_rule_group:

| ID | Name | Type | Value | Status | Priority | Memo |
|---|---|---|---|---|---|---|
| 3140 | BLK | I | 156.26.83.220 | E | 1000 | 21 fraud transaction |
| 3150 | BLK | E | %@netzero.com | E | 1000 | High fraudulent domain |
| 3160 | EXw | V | stephen | E | 1000 | Trusted customer |

Type: I-IP address, E-Email address, V-Vbuzzer ID...
Status: E-Enabled, D-Disabled.

- af_rule_index_convert:

| Index | Index Char | Index Number Min | Index Number Max | Index Value |
|---|---|---|---|---|
| PeRg | BLK | 0.00 | 99999.99 | 2000 |
| PeRg | EXt | 0.00 | 99999.99 | 1000 |
| PeS | Block | 0.00 | 99999.99 | 100 |

- af_rule_process:

| Process ID | Action ID | Parameter1 | Parameter2 | Action Order |
|---|---|---|---|---|
| 11 | T | | | 0 |
| 15 | L | | | 10 |
| 85 | H | 1 BDAY | | 0 |
| 85 | L | | | 10 |

- af_rule_channel:

| ID | Channel | Priority | Index00 Min | Index00 Max | ... | Index15 Min | Index15 Max | Memo |
|---|---|---|---|---|---|---|---|---|
| 245 | 22 | 5010 | 100 | 9999999 | ... | 0 | 9999999 | [PeS]:Account status abnormal |
| 247 | 22 | 47900 | 0 | 9999999 | ... | 1 | 9999999 | [PemRa_c_t]: Charged back from hardware ID before |
| | | | | | | | | |

FIG. 7 An Example of Tables in Rule Engine 330

- af_channel:

| ID | Name | Process ID | Memo |
|---|---|---|---|
| 0 | Default:L | 15 | Default Channel[LOAD], escaped from rules, credit immediately |
| 10 | Blocked:B | 10 | Blocked[Freeze transaction for ever], transaction did not happen |
| 22 | Traped:T | 11 | Traped[Do not pass to gateway], not reseller, $50, $100 |
| 26 | Stopped:S | 17 | Payment stop for some reason |

- af_base_transaction:

| Payment ID | Transaction ID | Gate | Item | Amount | Channel | Place Date |
|---|---|---|---|---|---|---|
| 247674 | 1168662430689bd | M | 1 | 10.00 | 0 | 2007-01-13 04:36:06 |
| 252431 | 5FH6759603893463L | P | 1 | 10.00 | 0 | 2007-02-14 21:05:42 |
| 252669 | 11715687255a0b9 | M | 70 | 200.00 | 22 | 2007-02-15 19:58:13 |

Gate: M-Moneris, P-PayPal;

| Payer ID | Payer Type | Payer Status | Payer IP | IP Country | Email |
|---|---|---|---|---|---|
| 4264***8463 | V | 5 | 151.201.32.200 | US | sylviadivemaster@yahoo.com |
| tie.hu@hotmail.com | P | V | 69.10.232.5 | CA | tie.hu@hotmail.com |
| 4482***0808 | V | 5 | 172.162.119.82 | US | bill_selt@yahoo.com |

Payer Type: V-Visa, M-MasterCard, P-PayPal;

| Customer ID | Hardware ID | Password | First Name | Last Name |
|---|---|---|---|---|
| divemaussyl | 7996352022469615271 | 250268 | Sylvia | Tan |
| stephen | 7996352022569852401 | qazokm | Tie | Hu |
| bill_selt | 4204914216714639718 | habi123 | | |

| Street | City | State | Country | Post Code | Phone |
|---|---|---|---|---|---|
| 317 Squire Cir | Pittsburgh | PA | US | 15212 | |
| 161 Old Sheppard Ave | North York | ON | CA | M2J3M2 | 14168831234 |
| | | | | | |

| Gate Status | Transaction Status | Admin Status | Indexes | Reason |
|---|---|---|---|---|
| A | L | | PeS:1;PeRg:100;PrRg:0;... | [PA, PeRBp_t]: Less or equal to $50 + Customer has at least 1 payment 2 months ago |
| A | L | | PeS:1;PeRg:+1000;... | [PeRg:EXt]:Exception Loaded |
| | T | | PeS:1;PeRg:0;PrRg:0;... | [PemRa_t_t]: Traped from hardware ID before |

FIG. 8 Example of Channelized Transaction Pool

- af_action:

| ID | Name | Is Final | Memo |
|---|---|---|---|
| B | Block | Y | Default Channel[LOAD], escaped from rules, credit immediately. |
| H | Hold | N | Hold the transaction for a period. |
| L | Load | Y | Load credit into account. |

- af_process:

| ID | Name | Memo |
|---|---|---|
| 11 | Trap:TRAP | Default Channel[LOAD], escaped from rules, credit immediately. |
| 15 | Pass:LOAD | Pass transaction, load credit immediately. |
| 85 | Hold:HOLD(1 BDAY)->LOAD | Hold for 1 business day then load credit. |

FIG. 9 An Example of Tables in Action Control Engine

■ af_base transaction:

| Payment ID | Transaction ID | Gate | Item | Amount | Channel | Place Date |
|---|---|---|---|---|---|---|
| 247674 | 1168662430689bd | M | 1 | 10.00 | 0 | 2007-01-13 04:36:06 |
| 252431 | 5FH6759603893463L | P | 1 | 10.00 | 0 | 2007-02-14 21:05:42 |
| 252669 | 11715687255a0b9 | M | 70 | 200.00 | 22 | 2007-02-15 19:58:13 |

Gate: M-Moneris, P-PayPal;

| Payer ID | Payer Type | Payer Status | Payer IP | IP Country | Email |
|---|---|---|---|---|---|
| 4264***8463 | V | 5 | 151.201.32.200 | US | sylviadivemaster@yahoo.com |
| tie.hu@hotmail.com | P | V | 69.10.232.5 | CA | tie.hu@hotmail.com |
| 4482***0808 | V | 5 | 172.162.119.82 | US | bill_selt@yahoo.com |

Payer Type: V-Visa, M-MasterCard, P-PayPal;

| Customer ID | Hardware ID | Password | First Name | Last Name |
|---|---|---|---|---|
| divemaussyl | 7996352022469615271 | 250268 | Sylvia | Tan |
| stephen | 7996352022569852401 | qazokm | Tie | Hu |
| bill_selt | 4204914216714639718 | habi123 | | |

| Street | City | State | Country | Post Code | Phone |
|---|---|---|---|---|---|
| 317 Squire Cir | Pittsburgh | PA | US | 15212 | |
| 161 Old Sheppard Ave | North York | ON | CA | M2J3M2 | 14168831234 |
| | | | | | |

| Gate Status | Transaction Status | Admin Status | Indexes | Reason |
|---|---|---|---|---|
| A | L | | PeS:1;PeRg:100;PrRg:0;... | [PA, PeRBp_t]: Less or equal to $50 + Customer has at least 1 payment 2 months ago |
| A | L | | PeS:1;PeRg:+1000;... | [PeRg:EXt]:Exception Loaded |
| | T | | PeS:1;PeRg:0;PrRg:0;... | [PemRa_t_t]: Traped from hardware ID before |

FIG. 10 A Example of Information Added to Transaction Database

FIG. 11 A Screenshot of FraudRank Displayed in Administration Panel

METHOD OF PROCESSING ONLINE PAYMENTS WITH FRAUD ANALYSIS AND MANAGEMENT SYSTEM

BACKGROUND

The invention relates to on-line fraud analysis and fraud prevention.

Credit card transactions are utilized in a variety of environments. In a conventional shopping environment, a user provides a merchant with a credit card during check-out, and the merchant through various means (such as through a driver's license or other picture identification cards) verifies that the card actually belongs to the user.

In another environment, due to the widespread adoption of electronic commerce (eCommerce), more merchants, institutions, and/or government agencies are putting products/services on their websites for customers to purchase online. In addition to physical products, the Internet is used to sell non-physical products such as software and content or related information and/or service over the Internet. Products such as Internet calling, online gaming, digital contents such as music and movie, online advertising, online information provisioning, for example, are sold as a privilege to obtain information or to consume service, or to consume a virtual experience such as gaming. In these types of transactions, the "shipping" of the product simply transmits information and/or usage credit to an email address, a user account with the merchant, or any suitable mechanism to make the product/service available to the purchaser.

Typically, a customer selects a number of products/services from an online catalog into a shopping cart. During check-out, the customer provides payment information such as credit card, debit card, PayPal account, for example, and shipping information to the merchant. The shipping information can be provided directly in the form of a physical address or indirectly in the form of an email address, or a user identification (UserID) from which the merchant can obtain the address.

Due to the anonymity of online customers and increased activities of online identity theft, online purchases represent a big risk for merchants. Unlike conventional purchases where customers are physically present for their purchases, online purchases can be made by people who don't own the credit card/debit card they use.

To counter fraudulent transactions, the credit card industry devised two verification procedures: Extra Security Check (ESC) and Address Verification Service (AVS). ESC is a mechanism that prints an extra verification code on using credit cards online. In evaluating online purchases, those who enter the correct verification code are considered to be safe, and their transactions are approved. PayPal has a similar mechanism "verified PayPal account" that PayPal gives high priority of transaction approval in evaluating online purchases. The drawback of ESC is the overhead associate with implementing such extra verification code. Additionally, organized hackers who can hack the credit card database would actually have access to the root information needed to execute extra verification process, thus rendering ESC meaningless.

AVS is designed to detect fraud by comparing the various addresses such as card owner's address, shipping address, mailing address, billing address a customer entered online with addresses stored in the database of credit card issuers. If they match the transaction is more likely to be authentic. AVS is another type of "extra security check" that can inevitably be hacked in the root; and can be too "shallow" to overcome hackers who can hack the entire database. In addition, AVS is often not available for international cards. AVS is not useful for checking the purchase of non-physical goods because the goods are not shipped to the buyer's physical address.

The ESC and AVS systems work well in a credit card transaction in which either the customer has a face-to-face meeting with the merchant or the merchant is actually shipping a package or the like to the address of a customer. The verification procedure typically includes receiving at the AVS system address information and identity information. However, for online service providers or merchants, address and identity information are generally insufficient to verify that the purchaser is actually the owner of the credit card. Many fraudulent transactions pass the strictest security measures such as "verified account" or "verified cards," but, in many occasions, the information on the credit/debit cards/any credit accounts has been "completely" stolen so the thieves can easily pass any security check imposed on the cards.

For the foregoing reasons, many online purchases are fraudulent, and these fraudulent transactions can only be detected months later when the merchant receives charge back requests well after the thieves have consumed the service at the expense of the merchant. Worst of all, the actual owners of the cards cast suspicion on the merchant as the potential thief who stole their credit information for creating fraudulent transactions that benefit the merchant.

Since arrangements between credit card issuers and merchants typically place liability directly on merchants when online fraudulent transactions take place, these merchants suffer loss of customer (or at least customer goodwill), incur charge-back fees from the credit card issuers, and may even loose their online payment privilege.

SUMMARY

In one aspect, systems and methods are disclosed to detect fraud in electronic payments by displaying a high value item next to commonly purchased items; and analyzing historical customer purchasing behavior and current purchasing behavior on the high value item for an indication of fraud.

Implementations of the above aspect may include one or more of the following. The system can collect payment information and check the payment information against an address verification system (AVS) to detect fraud. Fraud can be based on customer behavioral information. For example, the system can analyze page browsing behavior including each page viewed and time spent on each page; or by observing customer reaction or response to a credit card authorization failure. If the customer provides different cards with different names, the probability is high that the transaction is fraudulent. Fraud can also be determined by analyzing customer reaction to one of: a promotion, a give-away, a test credit, a gift. The system can determine fraud by checking if two separate accounts share the same password, particularly if the password is a strong password. The system can collect unique identification for a component of a client computer used to purchase items on line. The unique identification can be collected using client software. The system can determine fraud based on administrative information associated with a customer account. The system can capture a unique hardware identification (ID) from a client computer and using the unique Hardware ID to detect fraud. Fraud can also be detected by checking IP address nationality. The system's fraud analysis can include collecting payment information and checking the payment information against an address verification system (AVS) to detect fraud; determining fraud based on customer behavioral information; determining fraud by checking if two separate accounts share the same password; collecting unique identification for a component of a client computer used to purchase items on line; determining fraud based on administrative information associated with a customer account; and capturing a unique Internet Protocol (IP) address from a client computer and using the unique IP address to detect fraud.

Systems and methods are disclosed to detect fraud by analyzing customer purchasing behavior for a high value item intentionally placed next to commonly purchased items, payment information for an address verification system (AVS), customer behavioral information, password sharing between two accounts, unique identification for a hardware component of a client computer used to purchase items on line, administrative information associated with a customer account; and Internet Protocol (IP) address.

In another aspect, a system to detect fraud includes a transactional database to capture customer purchasing behavior for a high value item intentionally placed next to commonly purchased items, payment information for an address verification system (AVS), customer behavioral information, password sharing between two accounts, unique identification for a hardware component of a client computer used to purchase items on line, administrative information associated with a customer account; and Internet Protocol (IP) address; a fraud ranking engine coupled to the transactional database to generate a fraud likelihood assessment; and a rule engine coupled to the fraud ranking engine and the transactional database to approve an on-line transaction. Implementations of the above aspect may include one or more of the following. An administrative panel can be used with the fraud ranking engine to control customer accounts. A channelized transaction pool can operate with the rule engine. An action control engine can be connected with the channelized transaction pool and/or an online shopping cart. A payment gateway can communicate with the online shopping cart.

Advantages of the system may include one or more of the following. The system provides an effective, intelligent, and flexible transaction processor with fraud analysis and management function for online merchants. The system is effective in that that the system will reliably do its due job, e.g. prevent and control fraudulent transactions to a tolerable level. The system reduces threats arising from identify thieves and hackers who can hack into the root information of credit card/debit card/bank account owners. The system can effectively identify most frauds and prevent them over time. The system has intelligence in that the system can record new tactics generated by fraudsters on daily basis and can adjust to deal with new tactics, as well as to prevent known fraud tactics. The system provides flexibility in that the system can be adjusted quickly, if necessary in minutes, to combat against new fraud tactics. The system can also be customizable to fit the specific needs of various kinds of merchants. The fraud analysis and management system can be situated stand-alone on the merchant's website, without the need to rely on a remote, third party system that is generalized for all merchants at the expense of not being optimal for a particular merchant's need. The fraud analysis and management system helps merchants identify frauds and provide additional protection to the authentication system of the credit card issuers or payment processors and minimizes losses should the credit card issuers or payment processors fail to detect and prevent fraud.

BRIEF DESCRIPTION OF THE DRAWINGS

FIG. 5 is a screen shot of a Table in Transaction Database.

FIG. 8 is an example of Channelized Transaction Pool.

DESCRIPTION

The present invention is described herein with respect to one preferred embodiment for purpose of reference and explanation. It is understood that the present invention may be embodied in other forms and configurations than the exact specifications and configurations described herein.

Figure 1:
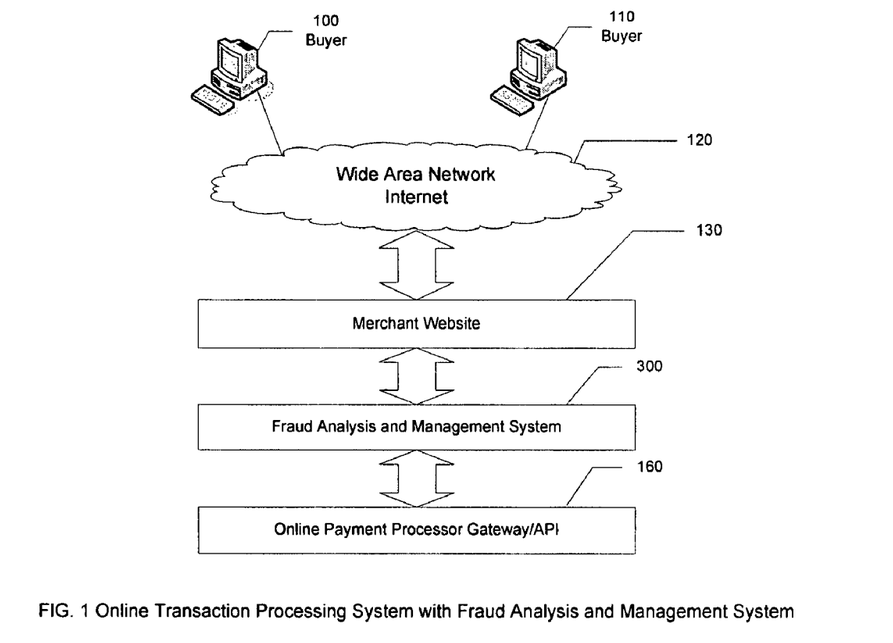
FIG. 1 is a system diagram illustrating an exemplary environment for deploying the Transaction Processing with Fraud Analysis and Management System.

FIG. 1 is a block diagram illustrating general relations the invented system has with a merchant's website and the Payment Processor Gateway/API. Typically, an Internet merchant has a website 130 containing web pages of products for sale. Customers 100 visit the website 130 over the Internet 120 and place products into online shopping carts. Each customer 100 makes the purchase by entering his or her credit card information and other necessary information to a check out page on the web site 130. The payment request is sent to an Online Payment Gateway application programming interface (API) 160 from banks or other financial institutions or processors (for example Moneris, PayPal, and InternetSecure, among others.). The payment processors authenticate and authorize the transaction and return the result to the merchant. The merchant receives the payment and prepares the purchase order accordingly.

To reduce frauds on the merchant at the check-out page, a Fraud Analysis and Management System (FAMS) 300 is placed between the merchant's Online Shopping Cart System (OSCS) at the website 130 and the Payment Processor's Online Payment Gateway or API (OPG) 160. The FAMS 300 interfaces and interacts with the OSCS of the site 130 and the OPG 160 to identify and prevent fraudulent transactions from passing through to the OPG 160, and sometimes reverses (refunds) passed-through transactions after acquiring more information from OPG 160 in case fraud is detected.

Figure 2:
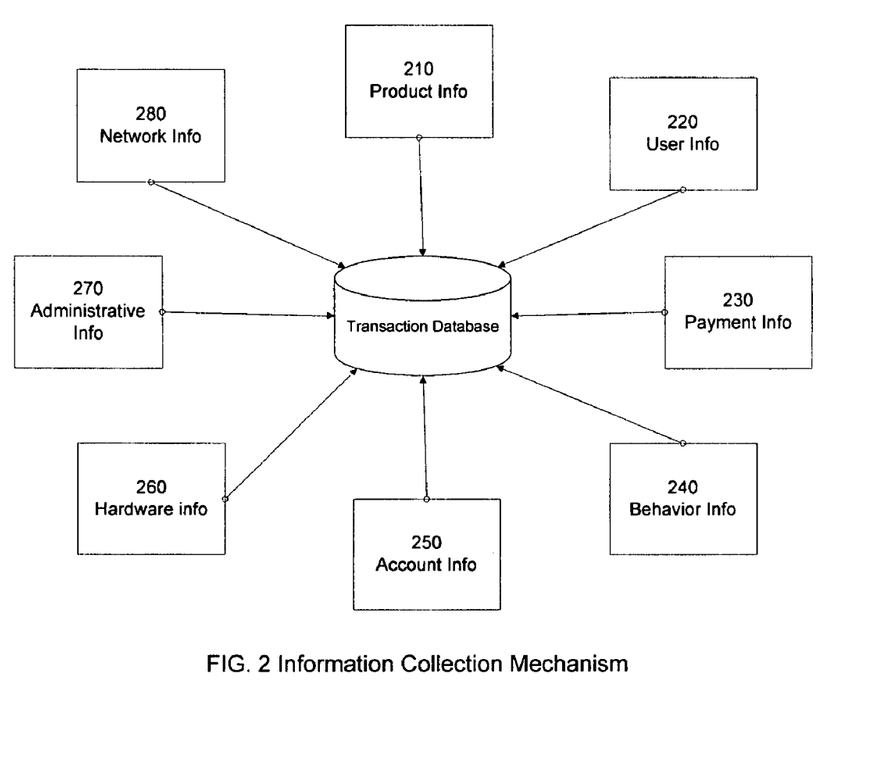
FIG. 2 shows an exemplary system to collect information for fraud detection and analysis.

FIG. 2 illustrates an exemplary database 201 that collects information to analyze and detect fraud. The information contained in the data structures helps the system sort attributes of regular customers and possibly fraudulent customers before and during their online purchases. Although there is no single reliable attribute that can effectively identify fraud, collectively the attributes are quite effective indicators of the likelihood of fraudulent transactions.

While some information such as the visitor's IP Address is readily available, other crucial information needs to be collected by intentionally devised mechanisms. All information collected is entered into a central database Transaction Database 201 as historical records that can be searched and compared with each new incoming transaction for fraud analysis.

The transactional database 201 collects product information data structure or block 210. The product information can be used for selling the product/service as well as for fraud detection. In one embodiment, special product items, especially high value, expensive items that merchants don't intend to sell on a regular basis, are placed together with regular items that merchants want to sell. The items purchased by the customer, when combined with other information, can provide a fairly accurate indication of the authenticity of the transaction. For example, an Internet telephony service provider to consumers may intend to sell calling credits at $10 and $20 value, but may place the following items for customers to choose:

$10/$20/$50/$100/$200

A customer who purchases a $10 or $20 calling credit is within the norm. A $50 calling credit selection is somewhat suspicious, and a $200 selection is highly suspicious, particularly when combined with other information such as if the customer only visits the website for ten seconds and goes straight for a $200 calling credit. However, if other information shows that the $200 pick is the $10^{th}$ purchase within a month after purchasing value of $10, $10, $20, $20, $50, $50, $100, $200, for example, then the likelihood increases that the purchase is real after consecutive consumption of service. Hence, the system places a few special items, typically high value items, together with regular items to provide useful and effective indicator for fraud analysis.

The system includes a User Information data structure or block 220 captures customer information typically through forms for customer to fill at the time submitting their purchases. In one embodiment, the information includes:

First Name
Last Name
Home Phone
Fax Number
Home Address
Shipping Address
Email

The information is commonly required to complete an online purchase and is still helpful, although not extraordinarily so, in assessing fraud.

The system includes a Payment Information data structure or block 230 that collects payment information which is mandatory to submit an online purchase. One embodiment includes:

Name on Credit/Debit Card
Card Type
Expiry Date on Card
Verification Code on Card
Password for the online use of the Card The information is sent into the Online Payment Gateway for AVS authentication and authorization, and can be compared with Customer Information block 220 to provide incremental fraud detection.

The system also includes a Behavioral Information data structure or block 240 which collects behavioral information of online visitors and customers. In one embodiment, behavioral information includes:

Information on browsing behaviors such as page views and the time each page is browsed, for example. The browsing behavior information can be valuable for assessing frauds. For example, a customer who made a purchase after viewing the product information pages and pricing pages for a predetermined time is more reliable as an actual purchaser than a customer who has not viewed any information at all. The pages viewed and the time spent can be recorded and numbered into Transaction Database and further indexed to reflect the merchants' perspectives on fraudulent behaviors.

Information on reactions to certain traps or bumps generated by the transaction. For example, if a customer tries to buy a $200 value from the choices of $10, $20, $50, $100, $200, and if the credit card authorization had failed, and the customer repeatedly attempts to authorize payment, each time with a different credit card with different names, the likelihood of fraud is very high. However, if the customer repeats the credit card authorizations with one credit card, the likelihood is high that the customer is trying to use his/her own card. By collecting the Behavioral Information with the Product Information block 210, merchants can gain further insights on their customers.

Information on reactions to promotions or giveaways or test credits, among others. For example, if a calling card merchant gives away 30 minutes test call credit and a customer purchases a $10 credit after spending 10 minutes of the test call credit, the purchase is probably authentic. If the customer purchases the $10 credit without bothering to test the service, the likelihood of fraud is increased.

Any other information on the customers' behaviors that helps indicate the likelihood of frauds.

The system also includes an Account Information data structure or block 250, which is an optional mechanism to create and capture customer account information. Many Internet merchants do not require customers to set up accounts on the websites, customers pick product items in open environments (not inside their accounts) and pay with credit/debit/bank cards, the relation is tied only on the transactions made. Although not mandatory, the present invention preferably prompts customers to set up accounts and make purchases after customers have logged into their accounts. The reason for the preference is that the username and password can be quite effective for identification of users. For example, if there are two users in the system with the following sets of username and password:

| User 1: | username: abc | password: bghyutc87e |
| User 2: | username: xyz | password: bghyutc87e |

In this example, the likelihood that both accounts were created by the same person, despite the vastly different user names, is very high. This observation is particularly true if the merchant has a large customer base. Many fraudsters diligently change their user names but not the password since changing passwords increases their workload to maintain matching pairs of user names and passwords. To effectively identify such relationship, a password strength detection system is used in one embodiment that prevents customers from inputting weak passwords (such as 123456) that are not effective in identifying relationship between passwords and users.

The system also provides a Hardware Information data structure or block 260 to collect information on the computer hardware that customers use to make the purchase. In one embodiment, client software is downloaded into the customers' computer for instant messaging and internet telephony. The client software, after being downloaded into customers' computers, has the ability to capture the computer hardware identification information (IDs) such as motherboard ID, microprocessor ID, network card ID, and Hard Disk Drive ID, among others. The client software can send the hardware information to the merchant's Hardware Information block 260. When a new account is created by a customer on a computer, the hardware information of the computer is sent together with the username, password etc, for example, as follows:

Username, Password, HWID, . . .

The HWID is the hardware identification fetched and stored in the database table for additional processing. Hence, if there are many sets of usernames and passwords sharing one HWID, the system knows that they were all created from one computer and would set a fraud indication or alert. Once a transaction is proven to be fraudulent, the username and corresponding hardware information can be used to block all transactions generated from one hardware ID. Unless the fraudster changes his or her computer, he or she is blocked from committing fraud on that merchant.

The system can also collect data for an Administration Information data structure or block 270. In one embodiment, the Administrative Information includes the date the account was created; the account status (active, on watch, or suspended, among others) and the frequency of payment. In one embodiment relating to calling cards, the phone numbers called including the country codes, area codes, and carrier codes. Certain indicators such as the longevity of the account (through the date of creation), and how frequently the account payments being made, can be highly effective indicators of the type of customer. The account status indicator can allow human intervention of the automated analysis.

The system also collects Network Information in block 280. The Network Information is usually the IP address from which the web visit is made. If IPV6 is deployed, every online device will be assigned a unique IP address and the Network Information data structure or block 260 can capture and use the unique IP address as another indicator of fraud.

In another embodiment that works with IPV4 protocol, the Network Information data structure or block 280 can record the visitor's IP address and the actual IP address of the computer. The client computer captures the computer ID by the software download, and the server captures the visitor's IP on its website, and because system has access to both the software running on the client computer and the server, the system can compare the 2 IP addresses. The embodiment can provide additional identification of the type of users. For example, if a user having a US IP address on his computer visits a US website through a non-US IP address, the likelihood of a fraudulent purchase is quite high.

Information collected by the above data structures or blocks 210-280 is entered into the Transaction Database 301 (FIG. 3) as data in tables stored in a transactional database 301 (FIG. 3) that can be a relational database so the tables are related to each other. The mechanisms set to acquire product information, behavioral information, account information, hardware information, and network information, together with other information acquiring mechanisms, and the calculation based on the information acquired, enable the merchants to independently analyze fraudulent transactions without the need to resort to any external data and external help.

Figure 3:
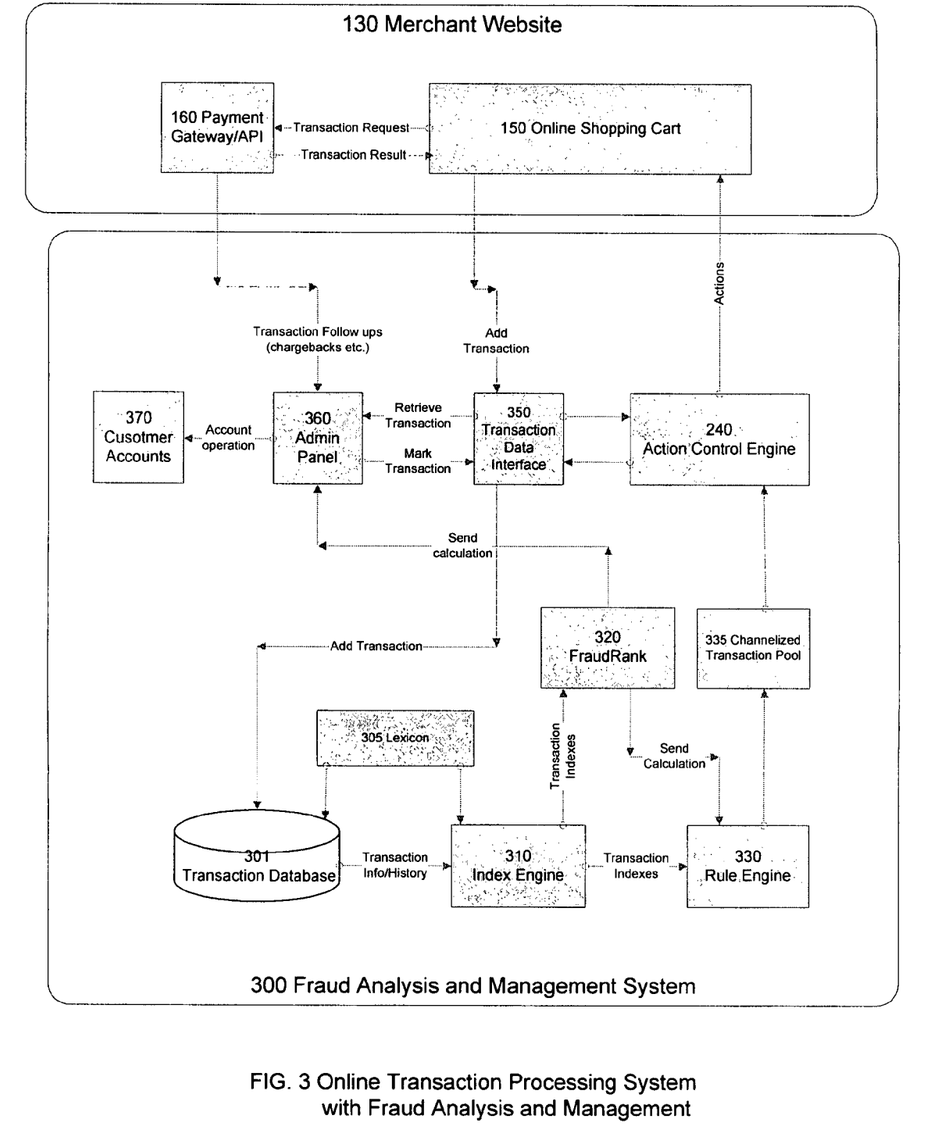
FIG. 3 is an exemplary system diagram illustrating the architecture and building block of Fraud Analysis and Management System.

Turning now to FIG. 3, an exemplary system diagram illustrating the architecture and building block of Fraud Analysis and Management System is shown. The system of FIG. 3 contains several sub systems, each dedicated for one major task and the sub systems collectively work together to analyze the likelihood of each transaction being fraudulent and process it accordingly. Whenever a transaction takes place, a transaction data interface collect all customer related information, and send the information to a transaction database. The information includes product information such as which products the customer choose to purchase; of user information such as the first name, last name, addresses, phone number, fax number, email address, etc; of payment information such as types of credit cards, information on the credit cards, security rating (verified/unverified, EC15/EC16/EC17 from cards processors (Moneris); of behavioral information such as how quickly the customers make purchases after login, how often the purchases are made over a period of time, how they react to some intentionally designed options and mechanisms etc; of account information such as username, password; of hardware information such as the ID of computer hard disk drive, ID of microprocessor, ID of network card, ID of motherboard etc; of administrative information such as the time of account being created, account activities etc; of network information such as the IP address where the visitor is coming from.

The transaction database 301 stores all the information in forms of keys in the database for then Index Engine 310 to build indexes based on them. Multiple indexes, as many as needed are created using one or more columns of tables in the database and are optimized for quick searching via a balanced tree. The indexes are copies of parts of tables structured in a specific format to help extract the key features of tracking/analyzing fraudulent transactions. The data collected is tagged to identify the attributors to transactions which subsequently proved to have been fraudulent, and the tagged data are used by the Index Engine to build necessary indexes to identify existing fraud attributes and learn new tactics of frauds. The indices are built and customized to the business needs of merchants. An important index for one merchant is probably not important or not needed at all for another.

The transaction database 301 provides transaction information and history to an index engine 310. A lexicon engine 305 communicates with the database 301 and index engine 310. The transaction indices from the index engine 310 are provided to a rule engine 330. The transaction indices are provided to a fraud rank engine 320, whose output is provided to the rule engine 330. The output of the rule engine 330 is provided to a channelized transaction pool 335, which in turn drives an action control engine 240. The action control engine 240 sends actions to the online shopping cart 150. The shopping cart 150 also receives transaction requests and transaction results from the payment gateway or API 160. The shopping cart 150 can add transactions to a transaction data interface 350, which in turn communicates with the action control engine 240. The transaction data interface 350 can retrieve transactions from an administrative panel 360 or mark transactions therefrom. The administrative panel 360 can post account operations to a customer account file 370. The accounts are helpful in establishing customer profiles of their online purchases, and password information can be highly reliable in determining relations between customers. It also brings advantage of relating payments to accounts instead of merely relating payments to discrete purchasing events.

The Transaction Data Interface 350 dispatches information it is given by the Action Control Engine 340, Online Shopping Cart 150, and Administration Panel 360. The data interface 350 also adds each new incoming transaction into Transaction Database 301. The data interface 350 stores information collected by various mechanisms about the customer account and the transaction, the information entered into the database 301 will be further processed through the subsequent steps. Once a transaction goes through all the process and be sent to OPG 160, OPG 160 will return additional information about the payer, the information will be received by 350 Transaction Data Interface and be added into 301 to go through the same process. The Rule Engine 330 and the Action Control Engine 340 may maintain or reverse its previous decision, in latter event a refund will be given to OPG 160 in order to avoid any charge back fees.

Based on the same transaction database, the FraudRank Calculator 320 is set forth to calculate the likelihood of a transaction being a fraud, the result of the calculation with brief notes of the key suspicious attributes of a transaction is sent to human administrators to decide how to process a transaction that is already pre-processed by the system automatically.

The Rule Engine 330 processes the indexes in form of tables, matrix, or database produced by the Index Engine. For example, the indexes table can be organized in the logics of data in a row represent "AND", and rows represent "OR"; the Rule Engine run through all the rows in a index table, and approve the transactions that comply with the indexes in row 1, or in row 2, or in row 3, or in row 4 and so on . . . hold transactions that comply with row 5 for human review, and disapprove transaction that do not comply with any row it scanned through. This is a very high level, exemplary introduction which will be discussed in details. Due to the ease of building indices by the Index Engine 310, the Rule Engine 330 can be complex, sensitive, flexible, quickly adjustable and scalable to deal with complex fraud situations.

The Administration Panel 360 is designed for the display, search, and review of all transactions and processing related information as well as all customer related information, human administrators can be authorized to alter the decisions the system made and/or made additional decisions, for example, put a payment that the system has approved on hold for a predetermined number of hours or days for further investigation. The Administration Panel 360 enables the merchant to administrate its business, customer accounts, transactions etc. The panel 360 administers the Customer Accounts 370 and can perform actions such as block account, suspend account, unblock account, load money to account, unload money to account. A payment is loaded into customer account by the Admin Panel 360 as a result of successfully going through the FAMS system. The Administration Panel 360 also carries administrative function of managing the merchant's accounts at OPG 160. Often, on a daily basis the OPG 160 sends charge back requests, disputes, among others to the Administrative Panel 360, as well as transfer funds to the merchant that it earned through customers' payments. In the event of receiving charge back requests, the Administration Panel 360 marks the transaction accordingly and send it to Transaction Data Interface 350, which will in turn send the request to the Transaction Database 301.

Other functions the Admin Panel 360 carries include managing the merchant's business activities, receiving and replying emails, checking status of customer accounts, tracking billings etc. In managing frauds, it also receives the FraudRank from The FraudRank Calculator 320 and it is subject to a human administrator's review to decide/re-decide what to do on a specific transaction based on its FraudRank.

Figure 4:
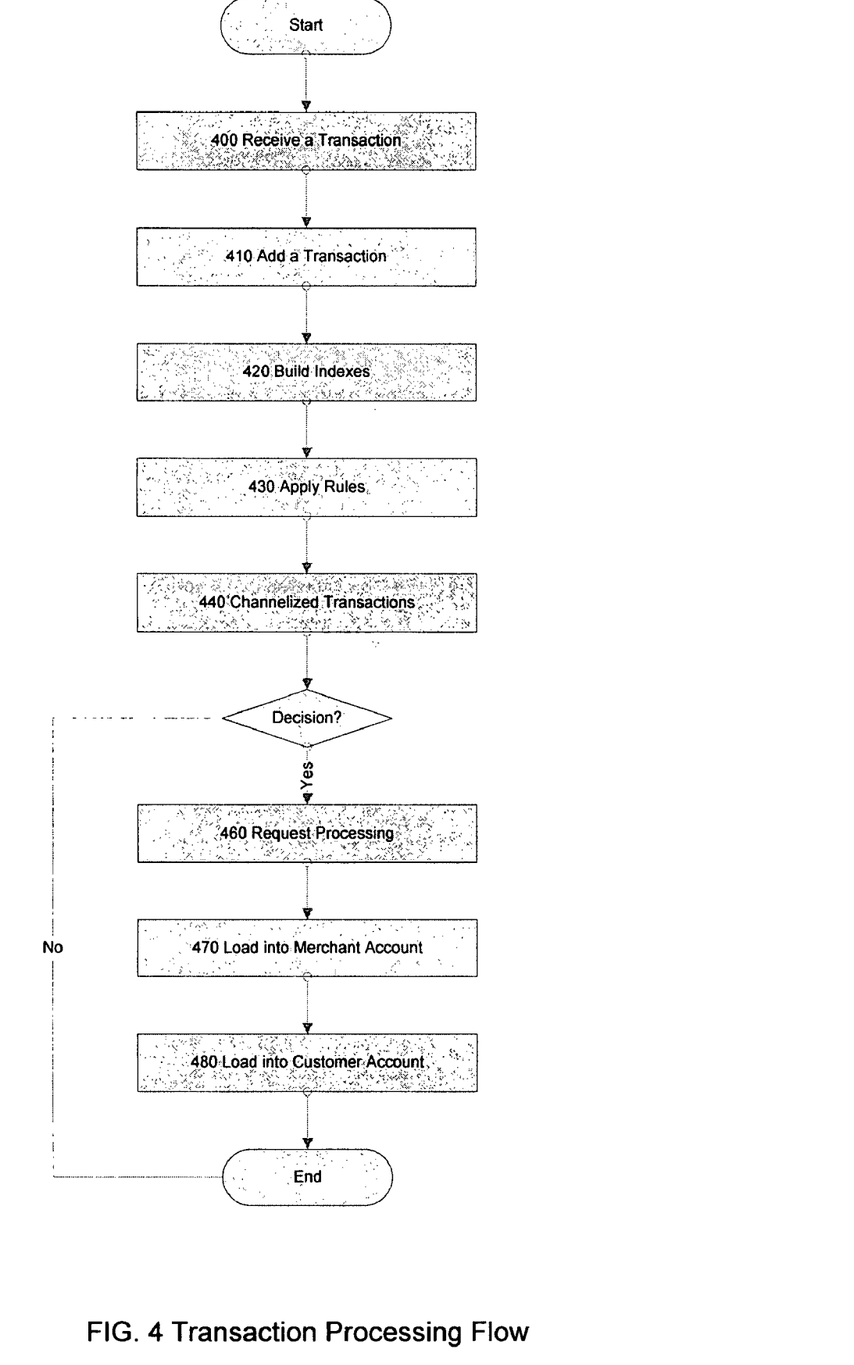
FIG. 4 is an exemplary flow diagram illustrating the general work flow of Transaction Processing with Fraud Analysis and Management System.

FIG. 4 is an exemplary Transaction Processing process illustrating the work flow of processing a new transaction. The work flow processes online payments with a system of analyzing and managing fraudulent transactions. All transaction related data collected into a transaction database server are indexed and ranked to determine the likelihood of fraud. The indexes and are further processed by a rule engine server to process the transactions accordingly.

In block 400, the system receives a new transaction from Online Shopping Cart 150 with information about the customer, its account, its computer hardware ID, and its payment itself. In block 410, Transaction Data Interface 350 sends the information about the transaction request into Transaction Database 301. This step is called "add a transaction". In block 420, based on the information added to Transaction Database 301, Index Engine 310 builds indexes on the transaction accordingly to reflect the important factors for fraud analysis. This step is called "build indexes". In block 430, the Rule Engine 330 applies its rule matrix/table on the indexes built in the previous step. This step is called "apply rules". In block 440, according to the result of step 430, the transaction is sorted and placed in an appropriate channel of Channelized Transaction Pool 335. This step is called "channelize transactions". In block 450, the Action Control Engine 340 make decisions on transactions sorted out in different channels. The decisions can be "approved", "conditional approved—on hold", "denied", "trapped", among others.

FIG. 4 shows a simplified yes or no scenario illustrating a typical work flow. If the decision is no, then the transaction request is denied, and information is returned to Transaction Data Interface 350 to display a failure message to the customer. At the same time, the denied transaction is sent to Administration Panel 360 as historic record and for human analysis.

In block 460, if the decision is yes, the transaction request is forwarded to OPG 160 where it will be authenticated and processed. In block 470, if the transaction is accepted by OPG 160, the payment will be loaded into the Merchant Account that the merchant has with OPG 160. In block 480, the Administration Panel 360 loads the paid amount to the Customer Account 370 accordingly. The customer will be able to see the money in the account and wait for the next steps, such as shipping, etc, or in some circumstances, consume the service.

The process of FIG. 4 provides merchants with fraud detection, analysis, and management for online purchases. The process also provides transaction processing system that processes incoming payments accordingly. The online purchases are the payments people made over public networks such as the Internet with credit cards, debit cards, PayPal accounts, bank transfer, or any type of remote payment methods without the card/account holders being physically present.

The system provides merchants with setting up online product items on the website, collecting information about customer's computer hardware ID, online shopping account ID and password, and setting up traps and loop traps to certain suspicious transactions.

In addition, the system provides a systematic method of detecting fraudulent online transactions on and within merchants' websites, even including extreme circumstances including, but not limited to, the circumstances that the information of account holders is stolen by unauthorized people, and products for sale are digital contents that are not shipped to physical addresses, and that there is no other centralized resource for the online merchants to resort to, and the combination of circumstances.

FIG. 5 shows examples of information stored in the tables of the database 301. The Transaction Database 301 stores information on historic transactions and user accounts. The Index Engine 310, or Index Database, is built on the Transaction Database 301. An index is a feature in a database that allows quick access to the rows in a table. An index is created using one or more columns of the table. Not only is an index often smaller than the original table (due to having fewer columns), but it is optimized for quick searching, usually through a balanced tree. An index in a relational database is a copy of a part of a table structured in a specific format. From its business parameters, the merchant determines what data are key parameters for it to monitor as effective fraud indicators. For example, if the shipping address is observed to be very meaningful, it should be extracted into Index Engine 310; if computer hardware ID is observed to be meaningful, it should go to the index engine 310; if the customer-created password is meaningful, it should go to the index engine 310; if the number of payments a customer made within a month is meaningful, it should also go to the index engine 310, for example. The merchant can always decide to include new types of information to be indexed by the index engine 310, and remove existing types of information from the index engine 310 as new insights are gained over time, and/or the fraud tactics are changing that make previously non-important information important now. The ability to optimize and expand the Index Engine 310 gives the merchant the ability to flexibly and nimbly adjust fraud detection techniques at any time.

Figure 6:
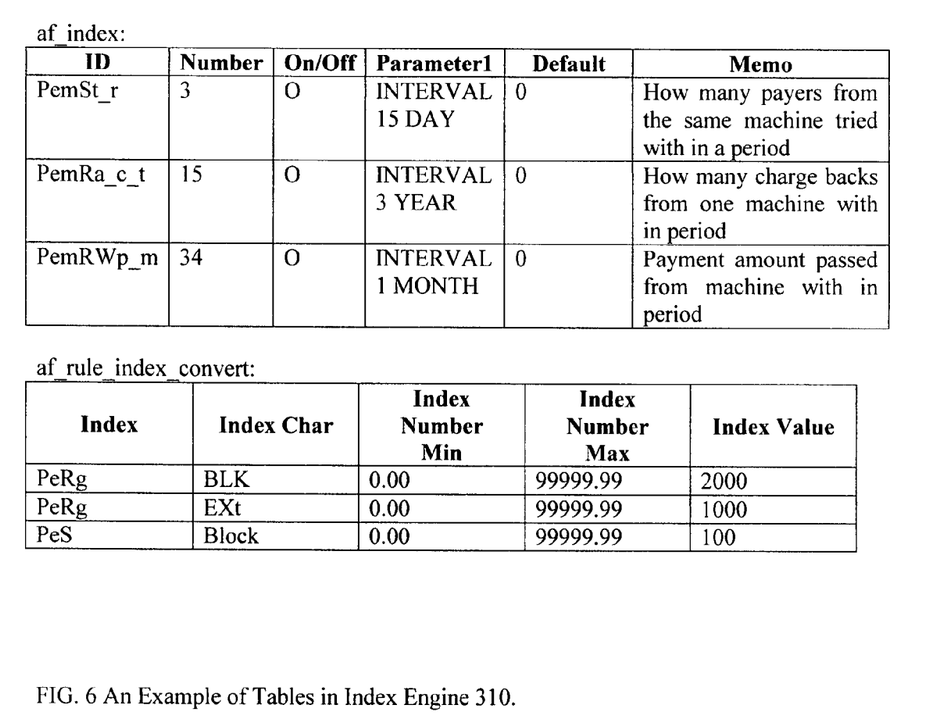
FIG. 6 is a screen shot of Index Engine.
Figure 7:
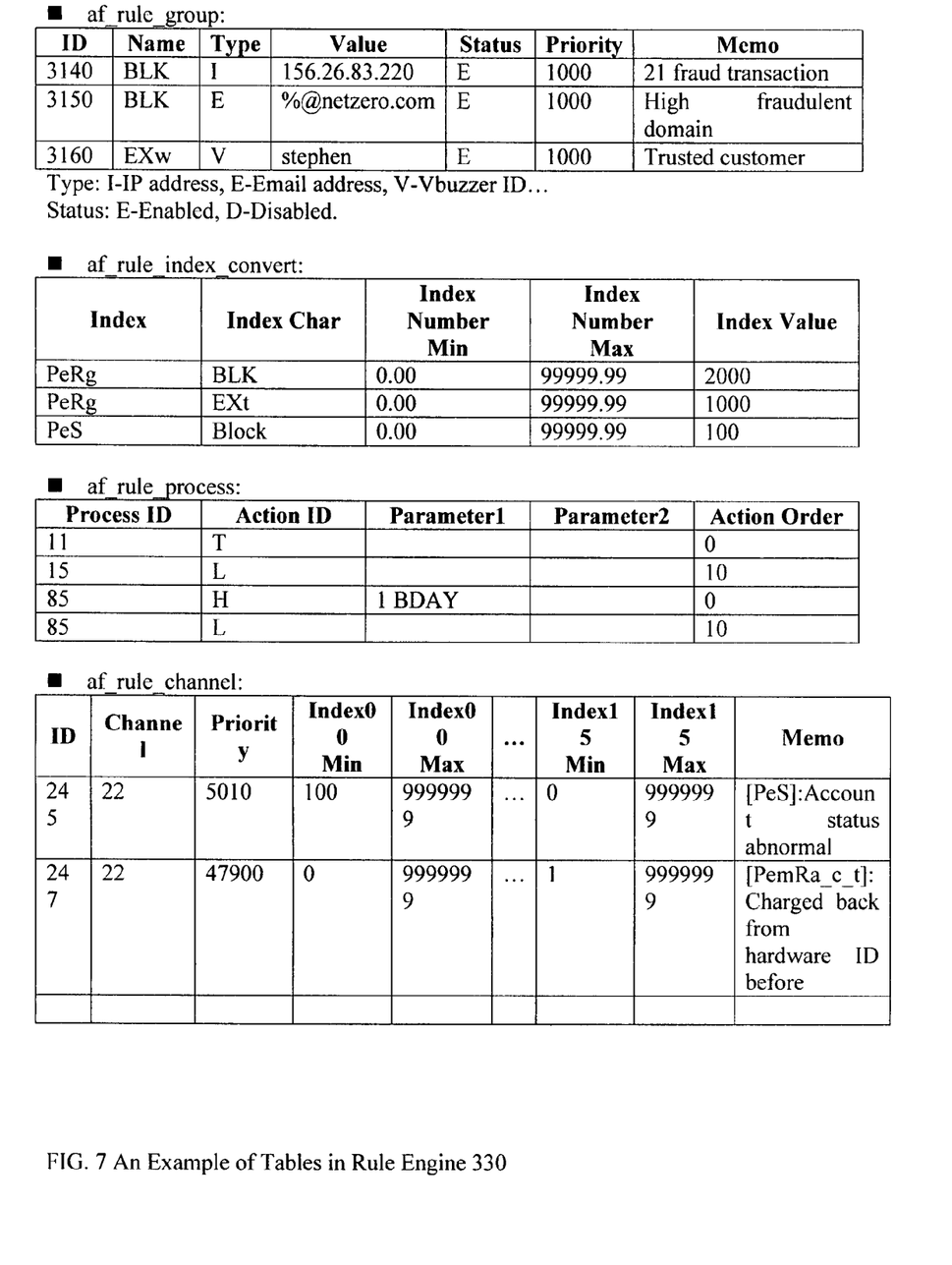
FIG. 7 is an example of tables in the Rule Engine.

The data in the Index Engine 310 is explained and synchronized by a Lexicon 305. FIG. 6 shows typical rows in a table of the Index Engine 310. From the table, the Lexicon 305 is created and maintained to help understand the meaning of data in each column. The Rule Engine 330 contains rule sets in forms of data in tables, or table matrix. Rule Engine can be understood as a big matrix of "if; then" logics as illustrated in FIG. 7. In the table of FIG. 7, data in a row represents the logic of AND, the columns in an entire row represent the logic of "if column 1 AND column 2 AND column 3 AND . . . are true; then do xx . . . " OR logic applies on the rows, e.g. "if row 1 OR row 2 OR row 3 OR . . . is true; then do y".

The Rule Engine 330 process all transactions through the Rule Matrix, "then" place them in respective channels accordingly,—this is what the "then" logics do,—place transactions that have different attributes into the Channelized Transaction Pool 335.

A Channelized Transaction Pool 335 is an interim database containing new incoming transactions, for example, transactions within the last 24 hours, in pre-defined distinct channels. The channels can be tagged with xxx yyy zzz as shown in the example of FIG. 8.

The Action Control Engine 340 calls actions to transactions in the Channelized Transaction Pool 335. The actions in this embodiment are a just a few decisions that have to be made on each transaction, e.g. what to do with each incoming transaction. They are "approved", "trapped", "denied", "on hold", "approved but on watch" and "refund". If needed, many actions can be put in place to reflect specific business situation of each merchant. The action "approved" means the transaction is trusted and will be sent to the Online Payment Gateway/API 160 to load the payment into the merchant's account with OPG 160.

For each transaction that is "approved" and sent to OPG, the system 300 receives additional information about the payer from OPG, the information will be processed through the same routes explained above, and if it failed to be tagged as safe transaction in the Pool 335, the Action Control Engine 240 will be triggered the action "refund", in this event the system will refund the payment already approved and loaded into merchant's account at OPG. By action "refund" merchant can avoid charge back and/or other disputes and the penalties resulted.

The action "trapped" means the transaction is trapped by the system 300 and will not be sent to OPG 160. A new web page will be displayed to the payer that the payment attempt failed. Once a transaction is trapped, all the subsequent attempts made from the same computer will be all trapped until a human administrator review them and remove the trap to that computer. Certain rules are set to trigger the action "trap" to reflect the high likelihood that the purchase is fraudulent. For example, if a customer uses a US credit card to purchase the most expensive product item listed, from a non-US IP address within 15 seconds of his first visit to the website, the purchase is most likely to be trapped.

The customer's subsequent actions after the failure of the first payment attempt usually provide additional and valuable information about his type, his relationship with other accounts, credit cards, computer hardware ID. Hence, such information is collected into the system for further "trapping", and this is called "loop trap". For example, within 10 minutes of the failure of the first payment attempt, the customer submits a number of different credit cards from a number of different IP addresses, the system would infer that the customer trying to defraud the merchant. The credit cards are most probably not his, and the IP addresses changes are most probably his attempts to use different proxy servers available on the public Internet. In many occasions a "trapped" user uses many different user accounts to try more payments, this gives the merchant an excellent chance to review the relationship between the used accounts, and block accounts that were previously believed legitimate.

An action "denied" means that a transaction is denied, a "denied" transaction will not be sent to the OPG 160 for processing—it is denied within the merchant's website. Usually the action is based on the known frauds, such as known fraudulent accounts; known computer hardware ID that fraudulent payments have been made from.

In one implementation, the system tracks the relationship between a user account and a computer hardware ID as follows:

A customer downloads client software in order to create a user account as there is no way of creating an account on the website.

The client software can get the computer hardware ID, such as the ID of motherboard, hard disk drive, microprocessor, network card and send it to the central database of the merchant.

Since customers can only register accounts using the client software, the relationship between a particular computer hardware and a customer account is known. For example, the following table indicates that account 1 and account 2 are registered from the same computer.

Computer hardware ID 1; account 1

Computer hardware ID 1; account 2

Since it's more difficult to change the computer and/or major computer components than to change other parameters like IP address, username, credit card used to purchase, among others, once a computer hardware ID has been captured, the fraudster will have to replace his computer if he wants to cheat the same merchant. This makes the continuation of his frauds almost prohibitive because of the money and time in acquiring another computer and/or computer component.

A table of blacklisted hardware ID is established based on the known fraudulent accounts (through charge back requests or through "trapped" transactions, or through human review), each new transaction that occurs, the hardware ID of it transaction maker will be collected and compared with this table, and if the ID is in the table, the transaction will be denied; if the ID is clean, other rules will kick in to decide how to process this transaction.

Account password is another strongly weighted parameter. The present invention sets password strength detection on the client software to ensure the password entered by the customer is sufficiently strong and if not prompts the customer to create another password. In a system that uses strong passwords where, the string is long and unique, and the likelihood of two random customers using the same password is low. Using this logic, the transaction will be denied if the customer has a password that is the same as the one used by a black-listed customer.

"On Hold" is the action that a transaction is sent to the OPG 160 for processing and is loaded into the customer's account, but the customer is required to provide further information or talk to the merchant's administrator before the product can be delivered. Examples include some payments made by a US credit card but from an international IP address, in such circumstances further contacts for explanations will be required.

Figure 9:
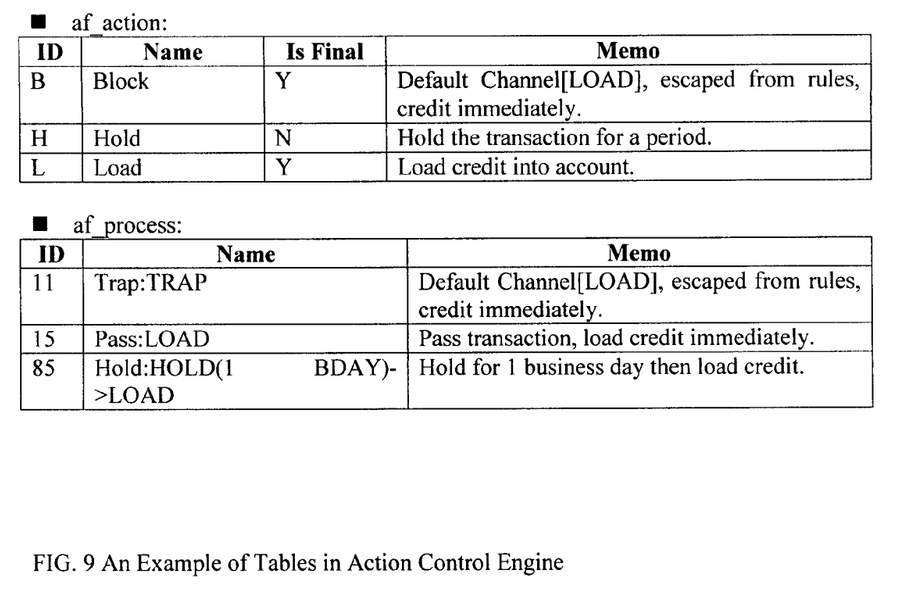
FIG. 9 is an example of tables in Action Control Engine.

"Approved but on watch" is the action to approve a transaction and send it to OPG 160 for processing, the money is loaded into customer's account without any conditions. However, the customer account will be tagged as "on watch" by a human administrator, usually this action reflects the merchant's belief that the transaction is safe but there are still something remained to watch, such as, in some rare situations, two customers may use the same password, and human review didn't find anything abnormal, so upon customer's request the system approves the transaction but additionally puts a tag on the account to further watch his behavior. Upon the merchant's request, more actions or logics can be added into the Action Control Engine 340. FIG. 9 shows an example of a table in Action Control Engine 340.

Figure 10:
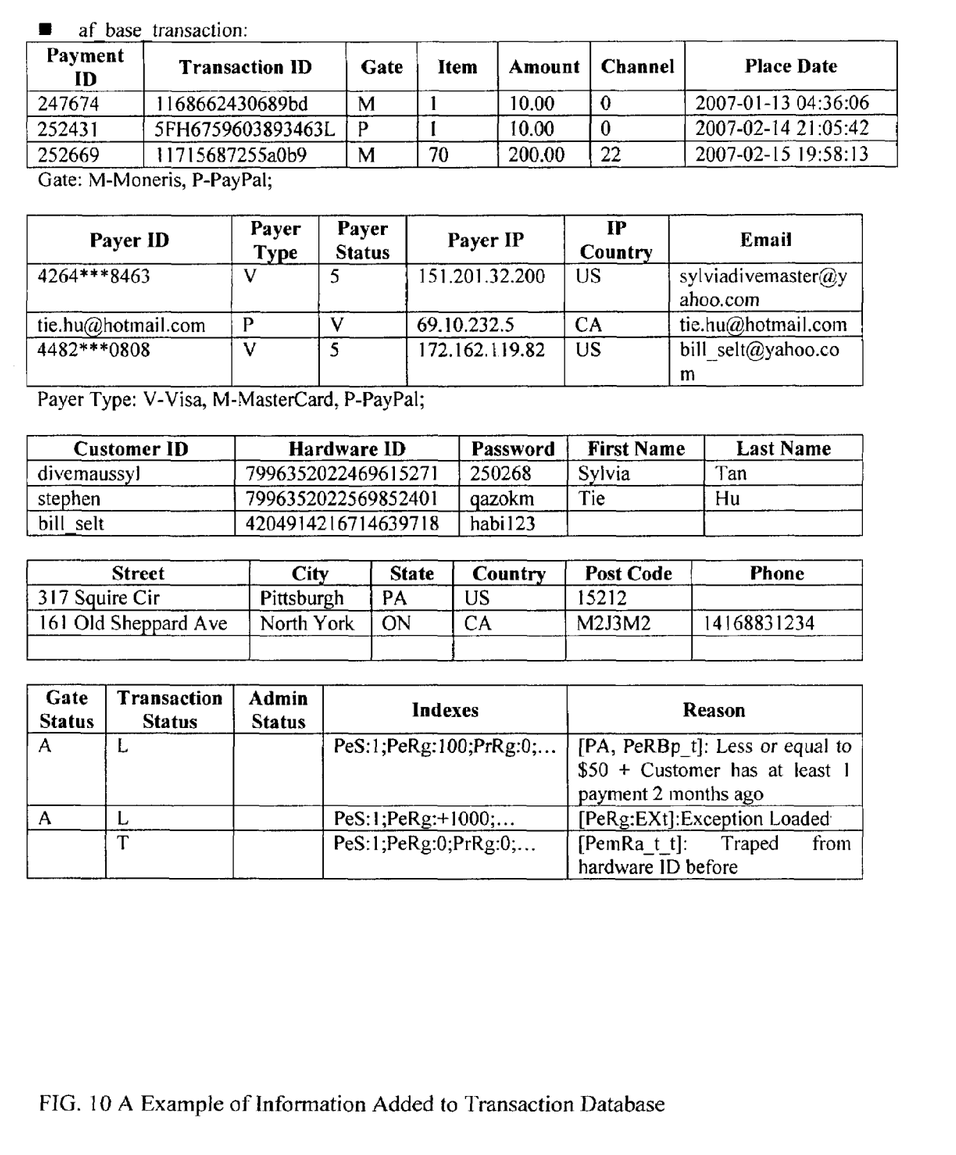
FIG. 10 is an example of new information added into Transaction Database.

One job for the data interface 350 is to add/retrieve transactions to/from the Administration Panel 360. Each transaction, regardless of the action taken on it, is entered using the Admin Panel 360, and in some cases the human administrator may alter the decision made by the System, in which case the request to alter will be sent to 350 for dispatching the request through Merchant Website 150 to OPG 160. FIG. 10 shows an example of new transactions that the Transaction Data Interface 350 added into Transaction Database 301.

Figure 11:
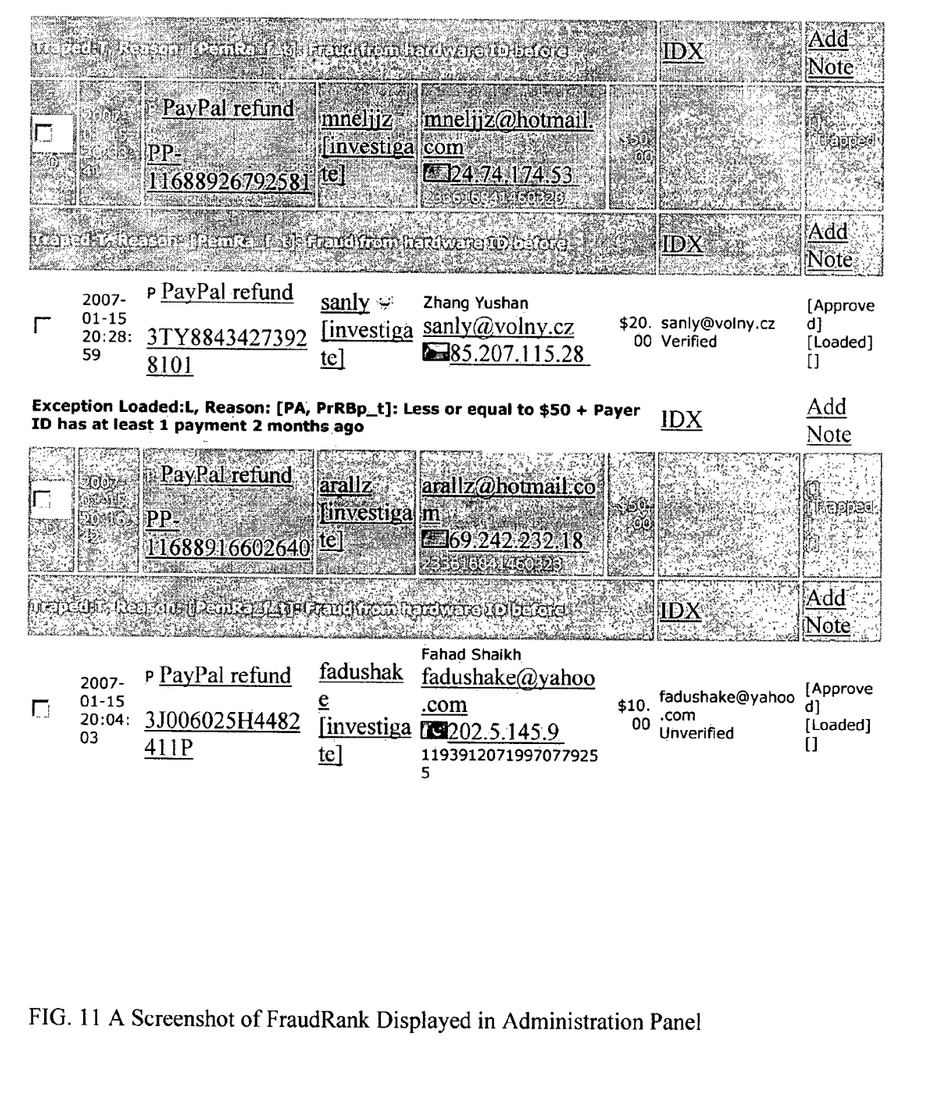
FIG. 11 is a screen shot of Fraud Rank displayed in Administration Panel.

FIG. 11 shows an exemplary screenshot of Administration Panel 360 with FraudRank. In this example, customer activities are ranked in different colors, such as white for the safe transactions, red for fraudulent, pink for suspected fraudulent, orange for hold, among others. In one embodiment, brief text notes also come with the colored FraudRank to advise the human administrator the key background of how the FraudRank was computed. Other methods can be applied to reflect the FraudRank as per the need of each merchant.

In the example of FIG. 11, Row 1 is a trapped transaction marked in dark red, and the notes indicate the reason is: the hardware ID has made fraudulent payments before, while Row 2 is a approved transaction marked in white color, and the last column indicates that the transaction is approved and the money is loaded into the customer's account.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the merchant web site 130 is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to detect fraud in electronic payments, comprising:
 a. displaying on a buyer's computer a high value item next to commonly purchased low value items where the high value item attracts fraud activity;
 b. analyzing by a computer system historical customer purchasing behavior and current purchasing behavior on the high value item for an indication of fraud;
 c. indicating a potential fraud if said buyer without a prior history buys the high value item; and
 d. authorizing a transaction if the historical customer purchasing behavior matches the current purchasing behavior.

2. The method of claim 1, comprising collecting payment information and checking the payment information against an address verification system (AVS) to detect fraud.

3. The method of claim 1, comprising determining fraud based on customer behavioral information.

4. The method of claim 3, comprising analyzing page browsing behavior including each page viewed and time spent on each page.

5. The method of claim 3, comprising determining fraud by observing customer reaction to a credit card authorization failure.

6. The method of claim 3, comprising determining fraud by analyzing customer reaction to one of: a promotion, a give-away, a test credit, a gift.

7. The method of claim 1, comprising determining fraud by checking if two separate accounts share the same password.

8. The method of claim 7, wherein the password is a strong password.

9. The method of claim 1, comprising collecting unique identification for a component of a client computer used to purchase items on line.

10. The method of claim 9, comprising collecting the unique identification using a client software.

11. The method of claim 1, comprising determining fraud based on administrative information associated with a customer account.

12. The method of claim 1, comprising capturing a unique Internet Protocol (IP) address from a client computer and comparing the IP to the IP used to browse the merchant's website to detect fraud.

13. The method of claim 1, comprising detecting fraud by checking IP address nationality.

14. The method of claim 1, comprising
  a. collecting payment information and checking the payment information against an address verification system (AVS) to detect fraud;
  b. determining fraud based on customer behavioral information;
  c. determining fraud by checking if two separate accounts share the same password;
  d. collecting unique identification for a component of a client computer used to purchase items on line;
  e. determining fraud based on administrative information associated with a customer account; and
  f. capturing a unique Internet Protocol (IP) address from a client computer and using the unique IP address to detect fraud.

15. The method of claim 1, comprising detecting fraud by comparing geographic information contained in a client computer's internet protocol address and a credit card holder's address.

16. The method of claim 1, comprising detecting fraud by capturing and comparing browser information of a client computer, including browser name, version, cookie, plug-in components, client time.

17. The method of claim 1, comprising:
  a. detecting fraud by capturing and comparing a client computer's time zone setting with a time zone where the client computer's IP address;
  b. detecting fraud by capturing and comparing the client computer's time zone setting with a time zone of a browser's IP address; and
  c. detecting fraud by capturing and comparing the client computer's language setting.

18. The method of claim 1, comprising detecting fraud by comparing a client computer identity against a blacklisted identification of computers associated with fraud.

19. The method of claim 18, comprising detecting fraud by comparing a cookie on the client computer with a list of blacklisted browser cookies.

* * * * *